(No Model.)
C. H. SIMMONS.
COTTON CHOPPER.
No. 387,262. Patented Aug. 7, 1888.
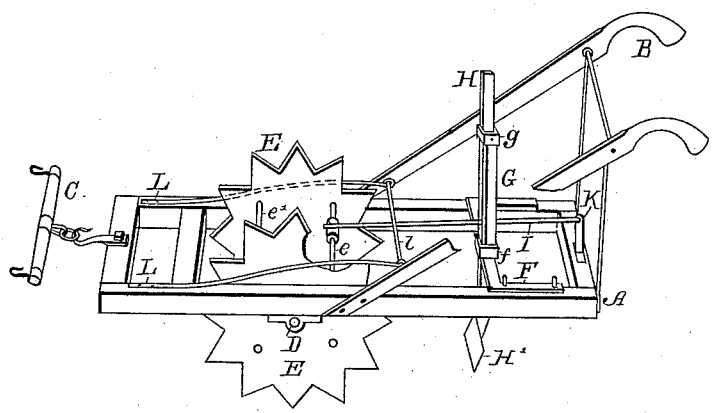
Witnesses.
F. J. Fischer,
Theo. J. Fischer.
Inventor,
Calvin H. Simmons
By his Attorney

UNITED STATES PATENT OFFICE.

CALVIN H. SIMMONS, OF MUNFORD, ALABAMA.

COTTON-CHOPPER.

SPECIFICATION forming part of Letters Patent No. 387,262, dated August 7, 1888.

Application filed March 24, 1886. Renewed January 9, 1888. Serial No. 260,154. (No model.)

*To all whom it may concern:*

Be it known that I, CALVIN HENRY SIMMONS, of Munford, in the county of Talladega and State of Alabama, have invented a new and useful Improvement in Cotton-Choppers, which improvement is fully set forth in the following specification and accompanying drawings.

In the drawing the present invention is illustrated by a perspective view.

This invention relates to an improvement in cotton-choppers; and it consists of toothed or corrugated disks connected by bars designed to operate as tappets upon a rearwardly-projecting lever attached to a vertical shank carrying a chopper at its lower end, so that as the device moves forward this vertical shank may be operated so that the cotton-row may be chopped out at regular intervals, all of which will now be set forth in detail.

In the accompanying drawing, A represents an ordinary frame, having rearwardly the handles B and provided at its forward end with a singletree, C, for the purpose of attaching the horses thereto. Within this frame the corrugated or toothed disks E revolve on the ends of the axis or shaft D. These disks are connected together by the tie-rods e, running from side to side.

Rearwardly from the disks D, I provide a transverse piece, F, having centrally a rectangular or square opening, f, and immediately above a spider, G, having an opening, g, centrally immediately over the opening f in the piece F. Within the opening f of the piece F and the opening g of the spider G, I provide a vertical shank, H, having at its lower end a broad shovel or cutter, H'. Between the piece I and the upper part of the spider K, I provide horizontal openings through the shank H, designed to receive a lever, L, hinged rearwardly at K to the cross-piece of the frame A, while its forward end is designed to rest upon the tappet bars or rods e, and is thus raised and lowered, carrying with it the vertical shank H, and cutter H' as the device moves forward, rotating the toothed disks E, and for this purpose the part of the lever I which passes through the shank H is designed to operate freely therein. In case the shank H is not heavy enough to successfully cut out the part of the row, I provide projecting springs L, secured over the sides of the frame A and connected rearwardly by a cross-bar, l, resting over the lever R. The tension of these springs is designed to be such that they will thus materially assist the weight of the shank H and chopper H' to drop positively after the passage of each tappet-bar e beyond the forward end of the lever R.

I am aware that it is not new in devices of this general description to have vertical cutters or choppers intermittently operated by the rollers or wheels of the device, and therefore do not broadly claim such construction or combination of parts.

Having described my invention, what I claim as new is—

1. The combination, in a cotton-chopper, of a vertical shank carrying the chopper at its lower end, a lever pivoted to said shank and hinged rearwardly to the cross-piece of the frame, driving-wheels connected by transverse tappet-bar, and a pair of springs and a cross-bar resting upon said lever, whereby a positive motion is imparted to the chopper, substantially as herein set forth.

2. The combination of the frame A, the toothed wheels E, the transverse bars e, the rearwardly-projecting springs L, and cross-bar l, the lever R, vertical shank H, having horizontal openings therein, and chopper H' at its lower end, substantially as herein set forth and described.

In testimony that I claim the foregoing I have hereunto set my hand, this 30th day of January, 1886, in the presence of witnesses.

CALVIN H. SIMMONS.

Witnesses:
EDWIN M. MILLER,
THOMAS JACKSON.